(12) United States Patent
Kato et al.

(10) Patent No.: US 6,259,768 B1
(45) Date of Patent: Jul. 10, 2001

(54) METHOD OF, AND APPARATUS FOR, CARRYING OUT LOOPBACK TEST IN EXCHANGE

(75) Inventors: Tomomi Kato, Tokyo; Masatoshi Takita, Kawasaki; Kazuei Ohnishi, Kawasaki; Takamitsu Saito, Kawasaki; Kosei Mano, Kawasaki, all of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/243,385

(22) Filed: Feb. 1, 1999

(30) Foreign Application Priority Data

Jun. 15, 1998 (JP) .................................................. 10-166680

(51) Int. Cl.$^7$ .............................. H04M 1/24; H04M 3/08; H04M 3/22
(52) U.S. Cl. .................................... 379/9; 379/16; 379/17
(58) Field of Search .................................... 379/1, 5–6, 9, 379/27–29, 10, 18, 28, 12, 14, 15, 16–17

(56) References Cited

U.S. PATENT DOCUMENTS 5,784,558 * 7/1998 Emerson et al. ..................... 709/230

FOREIGN PATENT DOCUMENTS

| 2-97151 | 4/1990 | (JP) . |
| 3-104366 | 5/1991 | (JP) . |
| 4-157842 | 5/1992 | (JP) . |
| 4-207544 | 7/1992 | (JP) . |
| 7-250076 | 9/1995 | (JP) . |

* cited by examiner

*Primary Examiner*—Duc Nguyen
(74) *Attorney, Agent, or Firm*—Helfgott & Karas, P.C.

(57) ABSTRACT

A method employs simple procedures to speedily carry out loopback tests on devices that form a channel system of an exchange. The method is capable of quickly locating a fault in the exchange and allowing speedy maintenance work of the exchange. Also provided is an apparatus for achieving the method. The apparatus has a path setter (1-4), a loopback controller (1-3), and a tester (1-1), to test the devices of the channel system (1-2) of the exchange. The devices to be tested are arranged in replaceable units (1-21, 1-22). The path setter (1-4) simultaneously sets paths to sequentially connect the devices to be tested. The loopback controller (1-3) activates and releases loopback parts arranged in the devices to be tested. The tester (1-1) sends a test signal to the devices through the paths, receives the test signal looped back by the loopback parts, analyzes the received signal, and determines whether or not the devices are sound.

8 Claims, 18 Drawing Sheets

METHOD OF, AND APPARATUS FOR, CARRYING OUT LOOPBACK TEST IN EXCHANGE

BACKGROUND OF THE INVENTION

1. Field of the invention

The present invention relates to a method of, and an apparatus for, carrying out a loopback test in an exchange. In particular, the present invention relates to a method of, and an apparatus for, carrying out a loopback test to diagnose devices that form a channel system of an exchange with the use of a loopback function provided for each of the devices.

2. Description of the Related Art

FIG. 9 shows devices that form a channel system of an exchange. The devices are a tester (TSTU) 9-1, subscriber terminals 9-21 to 9-23, individual devices (IND-A to IND-C) 9-31 to 9-33, common devices (COM#0 to COM#2) 9-41 to 9-43, and a switching unit (SW) 9-5.

Sub-highways (SHW0, SHW1) 9-61 and 9-62 are connected to the lower side of the common device 9-41, and sub-highways (SHW0, SHW1) 9-63 and 9-64 are connected to the lower side of the common device 9-42. Network highways (NHW0 to NHW2) 9-71 to 9-73 connect the common devices 9-41 to 9-43 to the switching unit 9-5. The devices also include unmounted subscriber devices IND-x and IND-y.

A mark "⊂" represents a loopback part through the drawings. Numerals attached to this mark like ⊂0, ⊂1, and ⊂2 correspond to sub-highway or network highway numbers connected to the lower side of a given device. For example, "⊂0" is a loopback part for a sub-highway 0 (SHW0) or a network highway 0 (NHW0).

A mark "⊂C" is a loopback part for a highway connected to the higher side of a given device. A mark "⊂L" is a loopback part of an individual device for a subscriber channel end.

The tester 9-1 sends a test signal such as a voice signal or an ATM cell signal to devices to be tested, receives the test signal looped back by the devices, analyzes the received signal, and diagnoses the devices.

The terminals 9-21 to 9-23 terminate channels for subscribers A to C, respectively, and have each a loopback part for looping back a test signal.

The individual devices 9-31 to 9-33 are subscriber devices for interfacing the subscribers A to C with channels and have each a loopback part ⊂L for the subscriber and a loopback part ⊂C for the common device.

The common devices 9-41 to 9-43 are line concentrators for multiplexing signals from the individual devices and demultiplexing signals to the individual devices. The common devices have each loopback parts ⊂0 and ⊂1 for the individual devices, as well as a loopback part ⊂C for the switching unit 9-5.

The switching unit 9-5 has a function of switching a main signal (communication information) transmitted through the network highways according to a destination and has loopback parts ⊂0 to ⊂2 for the network highways 9-71 to 9-73.

Japanese Unexamined Patent Publication Nos. 2-97151, 3-104366, 4-157842, 4-207544, and 7-250076, for example, disclose a technique of testing and diagnosing devices arranged in an exchange by installing loopback parts in each device, sending a test signal from a tester, looping back the test signal at the loopback parts, analyzing the looped-back signal at the tester, and determining whether or not the devices are sound.

FIGS. 10 and 11 explain loopback tests carried out on devices that form a channel system of an exchange, according to a prior art. In FIGS. 10 and 11, the same parts as those of FIG. 9 are represented with like reference numerals. FIG. 10 tests a path from a tester 9-1 to a connection end of a common device 9-42 for a sub-highway 9-63. FIG. 11 tests a path from the tester 9-1 to a connection end of the common device 9-42 for a sub-highway 9-64.

In FIG. 10, a path P1 indicated with a thick line is set from the tester 9-1 to a loopback part ⊂0 of the common device 9-42 for the sub-highway 9-63 through a common device 9-41, network highway 9-71, switching unit 9-5, and network highway 9-72, and then, from the loopback part ⊂0 of the common device 9-42 to the tester 9-1 through the same route.

A loopback part cl of the switching unit 9-5 for the network highway 9-72 is activated, and the tester 9-1 transmits a test signal, which is looped back by the loopback part ⊂1 of the switching unit 9-5. The tester 9-1 receives the looped-back signal, analyzes it, and determines whether or not the path to the loopback part ⊂1 of the switching unit 9-5 is sound.

The loopback part ⊂1 of the switching unit 9-5 is released, and a loopback part ⊂C of the common device 9-42 is activated. The tester 9-1 sends a test signal, which is looped back by the loopback part ⊂C of the common device 9-42. The tester 9-1 receives the looped-back signal, analyzes it, and determines whether or not the path to the loopback part ⊂C of the common device 9-42 is sound.

The loopback part ⊂C of the common device 9-42 is released, and the loopback part ⊂0 of the common device 9-42 for the sub-highway 9-63 is activated. The tester 9-1 transmits a test signal, which is looped back by the loopback part ⊂0 of the common device 9-42. The tester 9-1 receives the looped-back signal, analyzes it, and determines whether or not the path to the loopback part ⊂0 of the common device 9-42 is sound.

Thereafter, the path P1 is released, and a path P2 indicated with a thick line in FIG. 11 is set from the tester 9-1 to the loopback part ⊂1 of the common device 9-42 for the sub-highway 9-64 and from the same loopback part ⊂1 to the tester 9-1. The loopback part ⊂1 of the common device 9-42 is activated, and the tester 9-1 transmits a test signal to this loopback part ⊂1. The tester 9-1 receives a looped-back signal from the same loopback part ⊂1, analyzes it, and determines whether or not the path to the loopback part ⊂1 is sound.

FIG. 12 shows the steps of testing the common devices mentioned above. Steps 12-1 to 12-8 test the path P1 of FIG. 10. More precisely, step 12-1 sets an outgoing path from the tester 9-1 to the individual device 9-32 for the subscriber B through the common device 9-41, switching unit 9-5, and common device 9-42.

Step 12-2 sets a return path from the individual device 9-32 to the tester 9-1 through the same route as the outgoing path.

Step 12-3 activates the loopback part ⊂0 of the common device 9-42 so that a signal may be transferred from the outgoing path to the return path.

Step 12-4 instructs the tester 9-1 to send a test signal, receive a looped-back signal, and analyze the signal. Step 12-5 instructs the tester 9-1 to stop the test signal. Step 12-6 receives an analysis result from the tester 9-1 and examines it.

Step 12-7 releases the loopback part ⊂0 of the common device 9-42. Step 12-8 releases the outgoing and return paths, to complete the test of the path P1 of FIG. 10.

Steps 12-9 to 12-12 test the path P2 of FIG. 11. More precisely, step 12-9 sets an outgoing path from the tester 9-1 to the individual device 9-33 for the subscriber C through the common device 9-41, switching unit 9-5, and common device 9-42.

Step 12-10 sets a return path from the individual device 9-33 to the tester 9-1 through the same route as the outgoing path.

Step 12-11 activates the loopback part ⊂1 of the common device 9-42 so that a signal may be transferred from the outgoing path to the return path.

Step 12-12 executes the same processes as those executed in steps 12-4 to 12-8 to send a test signal, receive the test signal looped back by the loopback part ⊂1 of the common device 9-42, analyze the received signal, examine the analysis result, release the loopback part ⊂1 of the common device 9-42, release the outgoing and return paths, and complete the test.

Setting paths and loopback parts will be explained in detail. FIG. 13 explains setting a path in the switching unit 9-5 with the use of a time switch. Devices used to set a path are a write data selector (multiplexer) 13-1, a voice memory 13-2, a read data latch (demultiplexer) 13-3, an address counter 13-4, and a control memory 13-5.

Voice data of the subscriber A is sent to the subscriber B, and voice data of the subscriber B is sent to the subscriber A, to establish a conversation between the subscribers A and B. Namely, paths are set between the subscribers A and B. To achieve this, a voice memory address B-adr of the subscriber B is set at an address #A for the subscriber A in the control memory 13-5. A voice memory address A-adr of the subscriber A is set at an address #B for the subscriber B in the control memory 13-5.

Voice data A-data and B-data from the subscribers A and B are temporally divided and multiplexed by the multiplexer 13-1 and are written into the voice memory 13-2 in synchronization with the address counter 13-4. The voice data A-data from the subscriber A is written at the address #A in the voice memory 13-2, and the voice data B-data from the subscriber B is written at the address #B in the voice memory 13-2 in the sequence of, for example, A-data and B-data.

The control memory 13-5 stores a sequence of reading data out of the voice memory 13-2. Namely, addresses stored in the control memory 13-5 are read in synchronization with the address counter 13-4, and the addresses are used to read the voice data out of the voice memory 13-2.

More precisely, the voice data B-data and A-data are read out of the voice memory 13-2 in the sequence of B-data and A-data, and the read data are stored in the demultiplexer 13-3, which provides the subscriber A with the voice data B-data from the subscriber B, and the subscriber B with the voice data A-data from the subscriber A.

Writing the address B-adr of the subscriber B of the voice memory 13-2 at the address #A for the subscriber A in the control memory 13-5 is equal to setting a path from the subscriber B to the subscriber A, and writing the address A-adr of the subscriber A of the memory 13-2 at the address #B for the subscriber B in the memory 13-5 is equal to setting a path from the subscriber A to the subscriber B.

FIG. 14 shows any one of the loopback parts in the exchange of FIGS. 9 to 11. The loopback part has a selector 14-1, an upward path 14-2 coming from a subscriber, an upward path 14-3 going toward the exchange, a downward path 14-4 going toward the subscriber, and a loopback instruction line 14-5.

The selector 14-1 usually transmits a signal from the upward path 14-2 to the upward path 14-3. In response to a loopback instruction during a loopback test, the selector 14-1 transmits a signal from the downward path 14-4 to the upward path 14-3. Any loopback part in the individual devices, common devices, and switching unit has the structure of FIG. 14.

Setting paths and loopback parts according to the prior art will be explained in detail with reference to FIGS. 15 to 18. FIG. 15 shows devices that form a channel system of an exchange. The structure of FIG. 15 is a simple model only for explanation purposes. An actual channel system involves many devices, channels, and loopback parts. FIGS. 16 to 18 are flowcharts showing the steps of carrying out loopback tests according to the prior art.

In FIG. 15, there are a channel housing unit 15-1 for a subscriber A, a loopback part (LP-A) 15-11 incorporated in the unit 15-1, a channel housing unit 15-2 for a subscriber B, a loopback part 15-21 incorporated in the unit 15-2, a tester 15-3, and a switching unit 15-4. The switching unit 15-4 incorporates loopback parts (LP-a, LP-b, LP-c) 15-41, 15-42, and 15-43 for the subscribers A and B and tester 15-3, respectively, a data multiplexer (MLT) 15-44, a data demultiplexer (DMLT) 15-45, a voice memory 15-46, a control memory 15-47, and a counter (CNT) 15-48.

The voice memory 15-46 has addresses A-adr, B-adr, and C-adr where data from the subscribers A and B and tester 15-3 are written to, respectively. The control memory 15-47 has addresses #A, #B, and #C corresponding to the subscribers A and B and tester 15-3, respectively.

A loopback test according to the prior art must individually set paths and loopback parts for devices to be tested. To test the switching unit 15-4 and channel housing units 15-1 and 15-2, the prior art must execute the steps of FIGS. 16 to 19.

Steps 16-1 to 16-18 test the switching unit 15-4, steps 16-19 to 16-27 test the unit 15-1 for the subscriber A, and steps 16-28 to 16-36 test the unit 15-2 for the subscriber B.

When testing the switching unit 15-4, steps 16-1 and 16-2 set a path TSTU-A from the tester 15-3 to the subscriber A and a path A-TSTU from the subscriber A to the tester 15-3. Steps 16-3 to 16-7 set loopback parts, send a test signal, receive the test signal, analyze the received signal, and release the loopback parts. Steps 16-8 and 16-9 release the paths. Steps 16-10 and 16-11 set a path TSTU-B from the tester 15-3 to the subscriber B and a path B-TSTU from the subscriber B to the tester 15-3. Steps 16-12 to 16-16 set loopback parts, send a test signal, receive the test signal, analyze the received signal, and release the loopback parts. Steps 16-17 and 16-18 release the paths.

When testing the channel housing unit 15-1 for the subscriber A, steps 16-19 and 16-20 again set the paths TSTU-A and A-TSTU. Steps 16-21 to 16-25 set loopback parts, send a test signal, receive the test signal, analyze the received signal, and release the loopback parts. Steps 16-26 and 16-27 release the paths.

When testing the channel housing unit 15-2 for the subscriber B, steps 16-28 and 16-29 again set the paths TSTU-B and B-TSTU. Steps 16-30 to 16-34 set loopback parts, send a test signal, receive the test signal, analyze the received signal, and release the loopback parts. Steps 16-35 and 16-36 release the paths.

In this way, the prior art carries out loopback tests to locate a fault in devices of an exchange by individually setting paths to the devices, sending test signals to the devices, and diagnosing the devices according to the signals. Since recent exchanges have highly integrated devices and large capacity and involve many common devices, the prior art has the problems of:

(1) involving a large number of path setting processes for devices to test, to make the tests intricate and laborious;

(2) limiting a range of devices to test in spite of many paths to be set; and (3) increasing the number of tests to carry out because recent exchanges incorporate many channels, thereby elongating a testing time.

Maintenance work on an exchange must locate a fault in the exchange and replace a fault unit with a new one. The exchanges incorporate many functional devices among which a fault one must quickly be found and corrected.

SUMMARY OF THE INVENTION

An object of the present invention is to simply test replaceable units that form a channel system of an exchange, quickly locate a fault one among the replaceable units, and speedily maintain the exchange.

In order to accomplish the object, the present invention provides (1) a method of carrying out a loopback test on devices that form a channel system of an exchange by setting paths to connect the devices to one another, activating loopback parts arranged in the devices, sending a test signal from a tester to the devices through the paths, receiving the test signal looped back by the loopback parts, analyzing the received signal, and diagnosing the devices according to the analysis. The method is characterized by the steps of forming a signal route by activating some of the paths and loopback parts, to sequentially connect ones of the devices that are going to be tested and that form at least one replaceable unit, and sending a test signal from the tester to the signal route, receiving the test signal looped back by the activated loopback parts, and analyzing the received signal.

This method is capable of quickly and collectively testing devices that form a replaceable unit in a channel system of an exchange and determining whether or not a replaceable unit is fault.

(2) The signal route forming step may include the steps of setting paths for connecting all devices to be tested to one another in advance, and activating and releasing the loopback parts on each loopback test, to form a signal route for the loopback test and define a testing range for the loopback test. This technique quickly tests various ranges of devices in the exchange.

(3) The exchange may have a switching unit, common devices shared by channels, and individual devices provided for the channel, respectively. The switching unit serves as a higher device and the common and individual devices as lower devices. The higher and lower devices are sequentially connected to one another. A signal route used to carry out a loopback test on the lower devices is formed by releasing loopback parts of the higher device related to the lower devices without setting new paths. This technique instantaneously changes a range of devices to test and speedily completes a series of tests.

(4) The method may activate the loopback parts of the higher device related to the lower devices upon completion of the loopback test on the lower devices. This technique minimizes a route to devices to test without changing the paths initially set and protects test signals from attenuation, delay, and noise.

(5) The present invention also provides an apparatus for carrying out a loopback test on devices that form a channel system of an exchange. The apparatus has a path setter for simultaneously setting paths to sequentially connect some of the devices that are going to be tested and that form at least one replaceable unit, a loopback controller for simultaneously activating and releasing loopback parts arranged in the devices along the paths, and tester for sending a test signal to the devices through the paths, receiving the test signal looped back by the loopback parts, analyzing the received signal, and determining whether or not the devices are sound.

(6) The path setter may set paths for all devices to be tested in advance. The loopback controller may activate and release the loopback parts on each loopback test, to define a testing range for the loopback test. A range of devices to be tested may be changed by activating and releasing the loopback parts.

(7) The exchange may have a switching unit, common devices shared by channels, and individual devices provided for the channels, respectively. The switching unit serves as a higher device and the common and individual devices as lower devices. The higher and lower devices are sequentially connected to one another. A signal route to carry out a loopback test on the lower devices is formed by releasing loopback parts of the higher device related to the lower devices without setting new paths.

(8) The loopback controller may activate the loopback parts of the higher device related to the lower devices upon completion of the loopback test on the lower devices.

BRIEF DESCRIPTION OF THE DRAWINGS

The present invention will be more clearly understood from the description as set forth below with reference to the accompanying drawings, in which.

DESCRIPTION OF THE PREFERRED EMBODIMENTS

Figure 1:
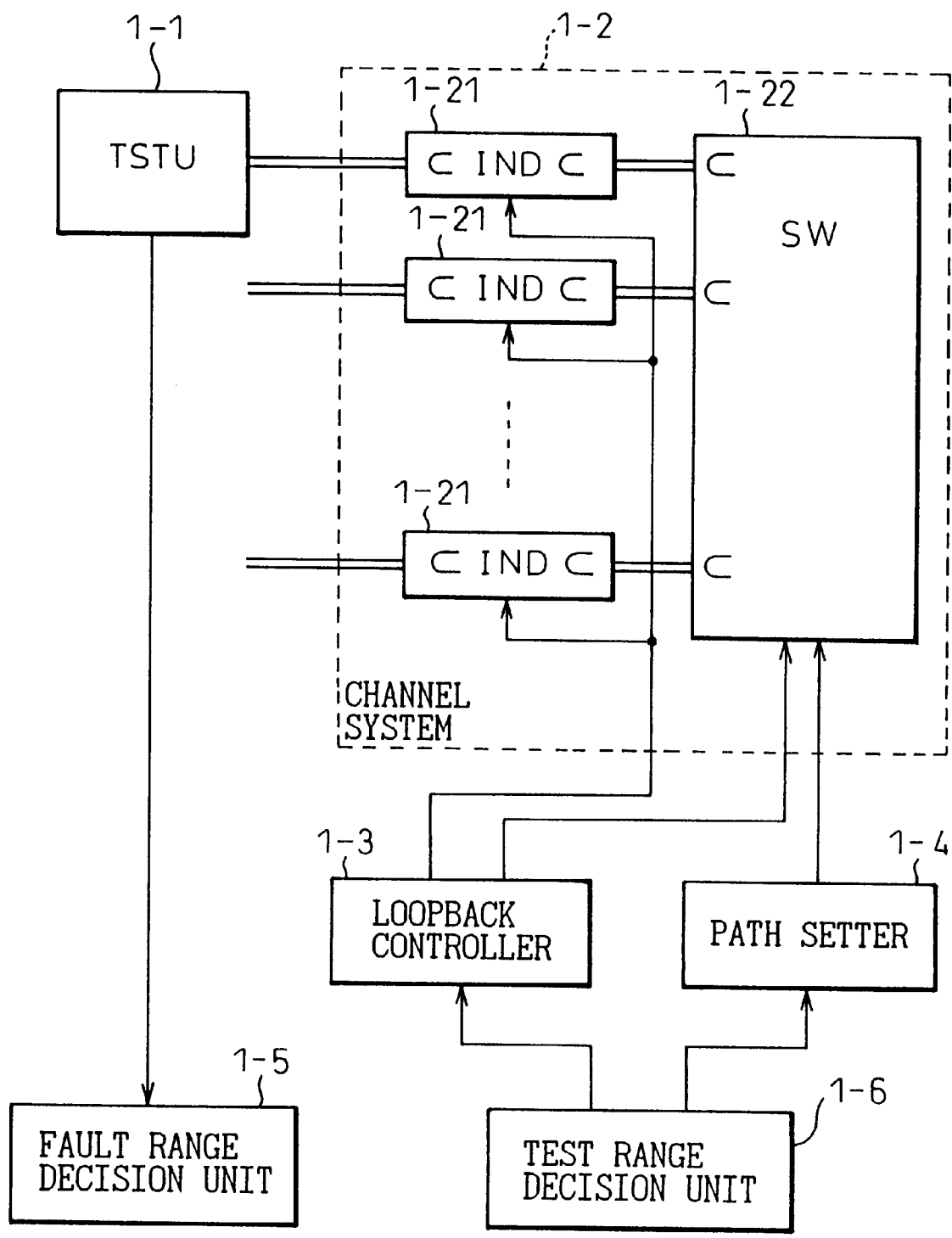
FIG. 1 shows a basic structure for carrying out a loopback test according to an embodiment of the present invention.

FIG. 1 shows a basic structure for carrying out a loopback test according to an embodiment of the present invention. The structure includes a tester 1-1, a channel system 1-2 of an exchange, individual devices (IND) 1-21, a switching unit (SW) 1-22, a loopback controller 1-3 for activating and releasing loopback parts, a path setter 1-4 for simultaneously setting paths, a fault range decision unit 1-5, and a test range decision unit 1-6. A mark "⊂" indicates a loopback part.

To test the devices 1-21 in the channel system 1-2, the test range decision unit 1-6 determines a range of devices to be tested, and the path setter 1-4 sets paths for connecting the devices to one another. The loopback controller 1-3 activates loopback parts ⊂ according to target ones among the devices to be tested.

The path setter 1-4 and loopback controller 1-3 determine a signal route through which the tester 1-1 sends and receives a test signal to and from the devices to be tested.

The test signal from the tester 1-1 is looped back by the loopback parts of the tested devices and is received by the tester 1-1, which analyzes the received signal and sends an analysis result to the fault range decision unit 1-5.

According to the analysis result, the fault range decision unit 1-5 determines a fault range among the tested devices. The fault range is narrowed to a replaceable unit in the channel system 1-2. If a fault device is found, a replaceable unit that incorporates the fault device is determined to be within a fault range.

To narrow a fault range, the test range decision unit 1-6 determines a new test range of devices and instructs the loopback controller 1-3 to activate or release loopback parts in the devices in the newly set test range and form a new signal route.

At this moment, it is not necessary to release the paths already set. Without canceling the paths already set and without setting new paths, the present invention forms a new signal route by activating and releasing loopback parts in the devices to be tested. Thereafter, the tester 1-1 sends a test signal, receives the test signal looped back by the loopback parts, analyzes the received signal, and narrows the fault range.

In this way, only by sending a test signal from the tester 1-1 and receiving and analyzing the test signal at the tester 1-1, the present invention diagnoses the devices in the channel system 1-2. Namely, the present invention is capable of simultaneously testing many devices to speedily complete maintenance work on a given exchange. The present invention sets a new signal route to narrow a fault range of devices only by activating and releasing loopback parts arranged in devices to be tested without newly setting or releasing paths. This simplifies loopback tests and shortens a time for carrying out the tests. Namely, the present invention is capable of minimizing a time for locating a fault in a given exchange.

Figure 2:
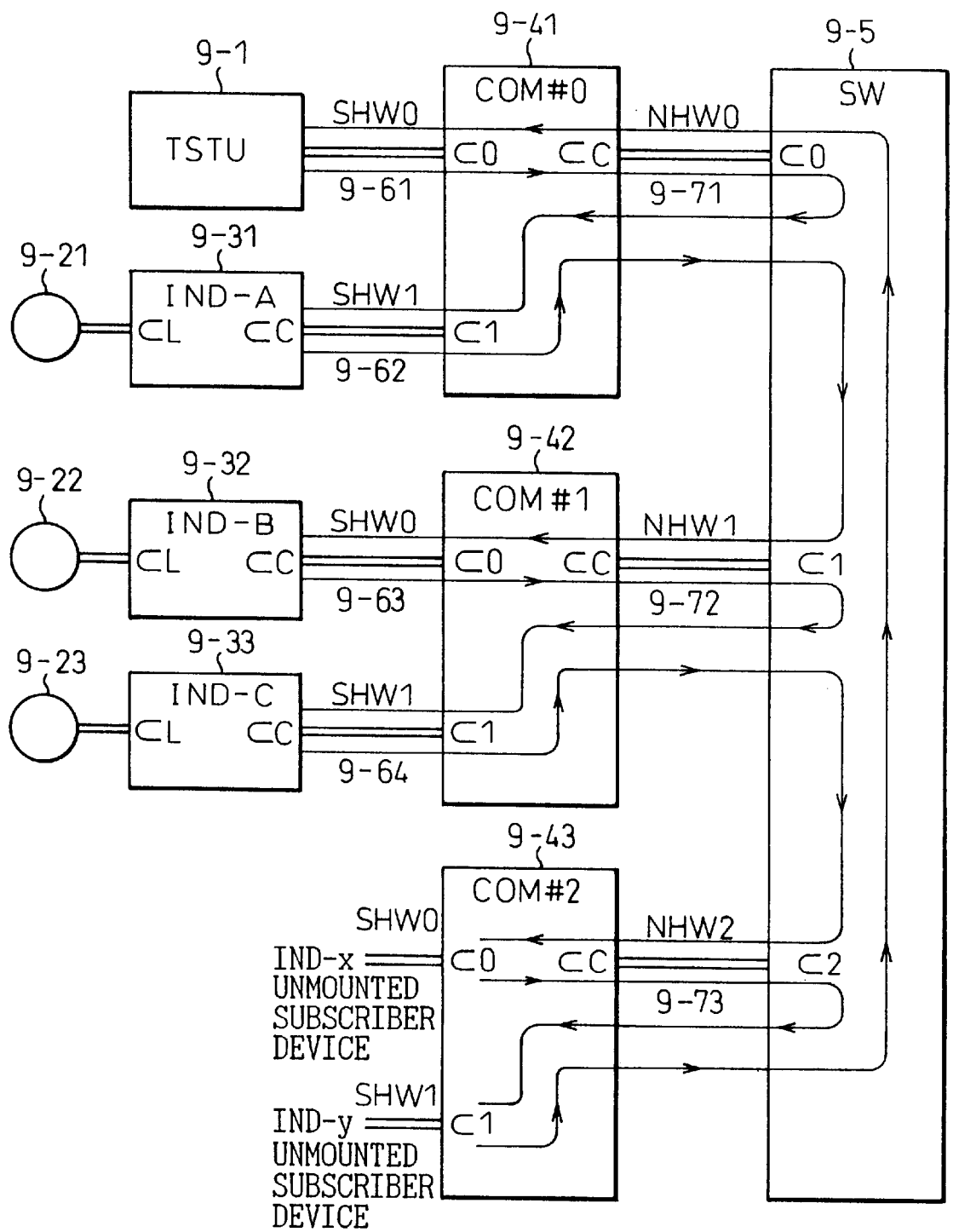
FIG. 2 shows paths set according to the present invention in a channel system of an exchange.
Figure 3:
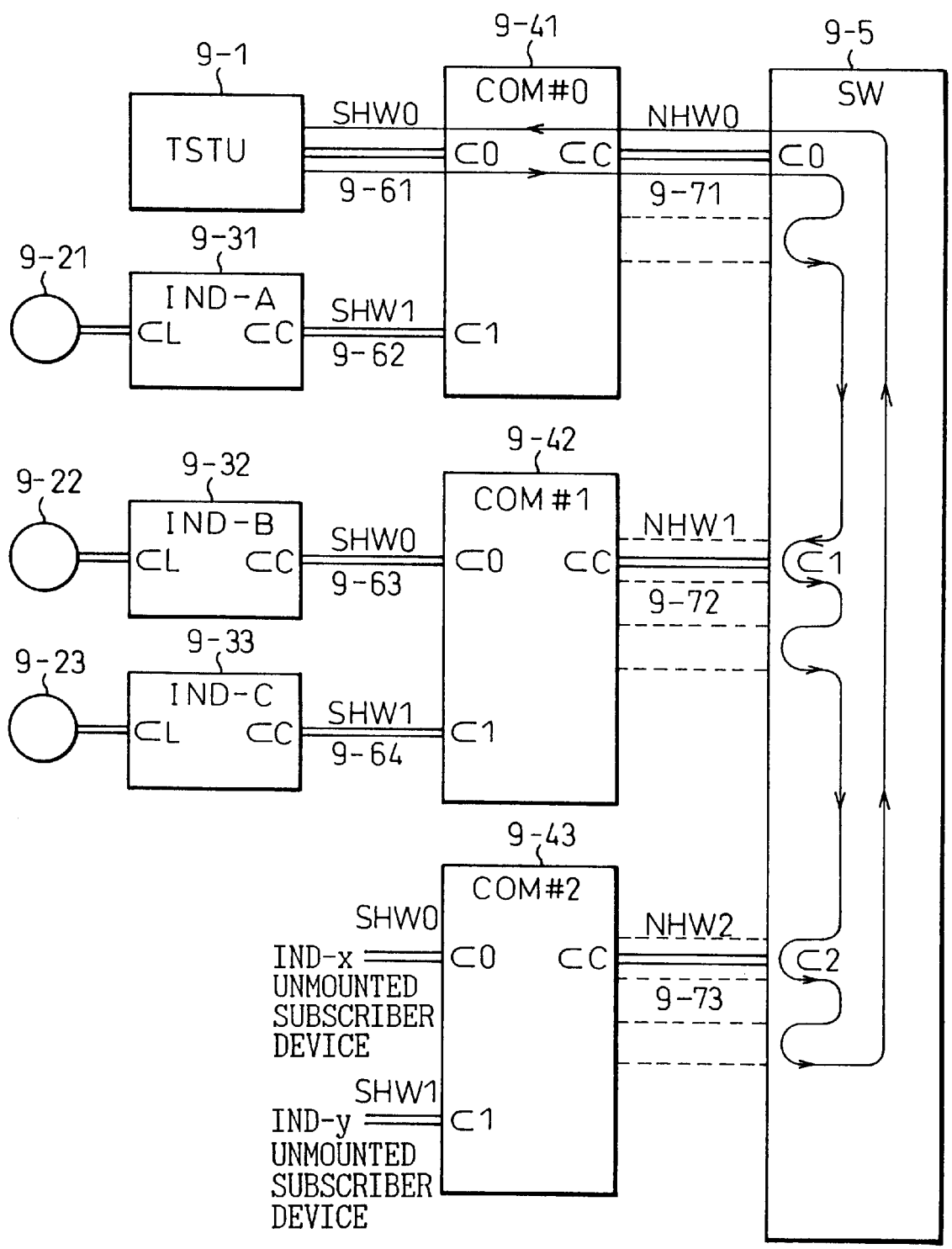
FIG. 3 shows loopback parts set according to the present invention in the channel system of FIG. 2.
Figure 4:
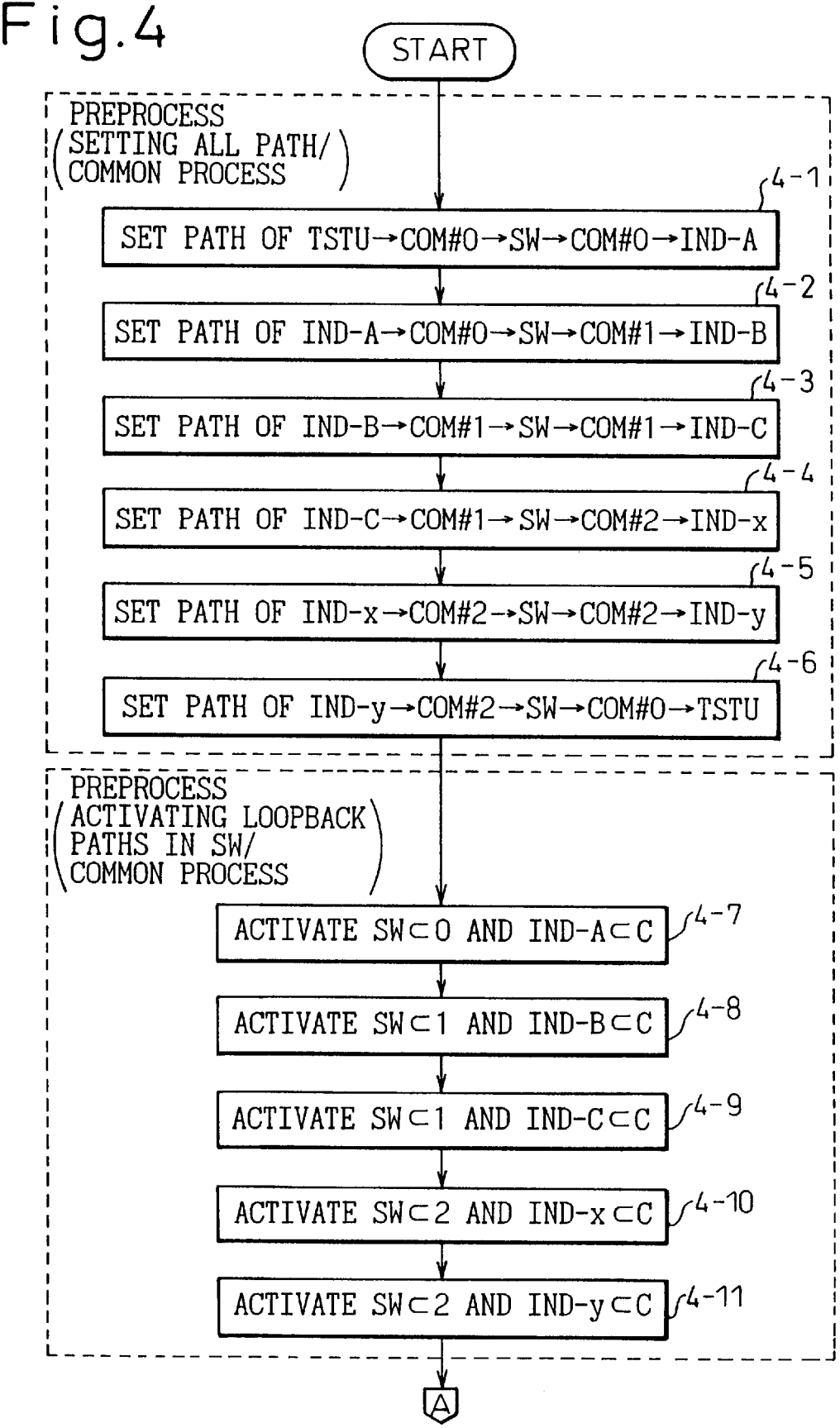
FIGS. 4 and 5 are flowcharts showing the steps of testing a switching unit of the exchange of FIG. 2 according to the present invention.
Figure 5:
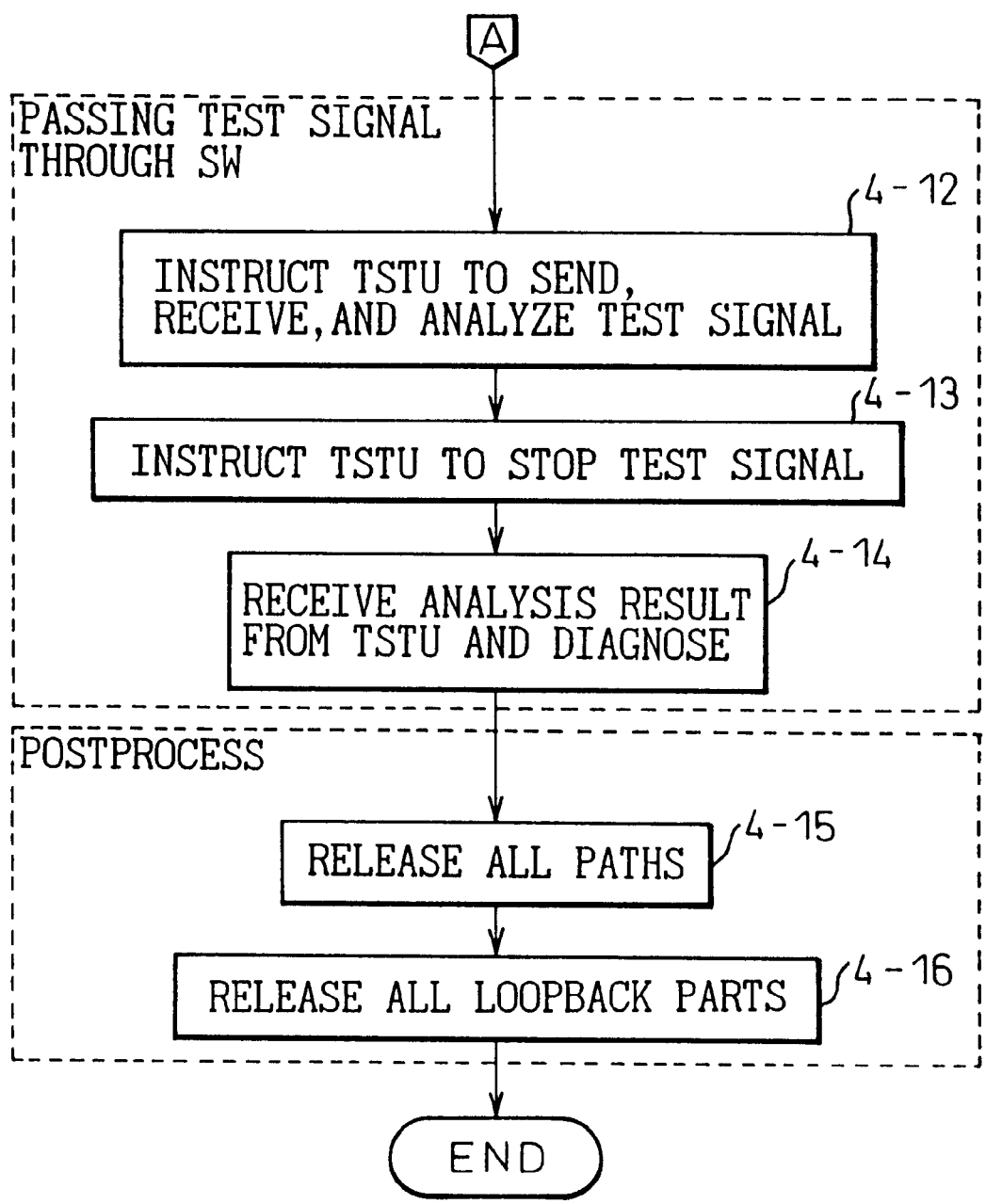

A method of carrying out loopback tests according to an embodiment of the present invention will be explained in detail with reference to FIGS. 2 to 8. First, a method of testing a switching unit (SW) of an exchange will be explained with reference to FIGS. 2 to 5, in which FIG. 2 shows paths set according to the embodiment in a channel system of the exchange, FIG. 3 shows loopback parts set according to the embodiment along the paths, and FIGS. 4 and 5 are flowcharts showing the steps of testing the switching unit SW according to the embodiment. In FIGS. 2 and 3, the same parts as those of FIG. 9 are represented with like reference marks and are not explained again.

Steps 4-1 to 4-6 of FIG. 4 carry out a preprocess of setting paths for connecting all devices to be tested, as indicated with arrows in FIG. 2. More precisely, step 4-1 sets a path from a tester (TSTU) 9-1 to an individual device (IND-A) 9-31 through the switching unit (SW) 9-5. Step 4-2 sets a path from the individual device IND-A to an individual device (IND-B) 9-32. Step 4-3 sets a path from the individual device IND-B to an individual device (IND-C) 9-33. Step 4-4 sets a path from the individual device IND-C to an unmounted subscriber device IND-x. Step 4-5 sets a path from the device IND-x to an unmounted subscriber device IND-y. Step 4-6 sets a path from the device IND-y to the tester TSTU.

The maximum number of paths to be set is equal to the number of paths to guide a main signal to all individual devices to be tested. Usually, paths are set to pass a main signal through replaceable units to be tested in a given exchange and to sufficiently perform loopback tests in the exchange.

Unlike the prior art that must set paths on every loopback test, the present invention sets paths only once to connect all devices to be tested.

To set paths, the switching unit SW is provided with a control memory for storing information that specifies a sequence of path connections. According to this information, a time switch is controlled to transfer a signal looped back by an individual device to the next individual device. Alternatively, a self routing switch module may be employed. In this case, an individual device adds a tag indicating the next individual device to a looped-back signal, and according to the tag, the switching unit SW autonomously sets a path (SRM: Self Routing Switch Module).

Activating and releasing loopback parts will be explained. A test signal from the tester TSTU is passed through the switching unit SW and paths to devices to be tested and is returned to the tester TSTU. To achieve this, loopback parts must be activated and released in each of the devices to be tested.

A technique of activating loopback parts is dependent on the structure of devices. For example, a time switch simply loops back a signal. A self routing switch changes a tag to loop back a signal.

Unlike the prior art that activates loopback parts for a single device to be tested, the present invention activates and releases several loopback parts along several paths. Unlike the prior art that must set and release paths whenever testing a device, the present invention sets all paths for devices to be tested in advance, and thereafter, only activates and releases loopback parts for devices to be tested.

Steps 4-7 to 4-11 of FIG. 4 activate loopback parts in the switching unit SW. More precisely, step 4-7 activates a loopback part SW⊂0 of the switching unit SW for the individual device IND-A and a loopback part IND-A⊂C of the individual device IND-A.

Step 4-8 activates a loopback part SW⊂1 of the switching unit SW for the individual device IND-B and a loopback part IND-B⊂C of the individual device IND-B. Step 4-9 activates the loopback part SW⊂1 for the individual device IND-C and a loopback part IND-C⊂C of the individual device IND-C. Step 4-10 activates a loopback part SW⊂2 of the switching unit SW for the device IND-x and a loopback part IND-x⊂C of the device IND-x. Step 4-11 activates the loopback part SW⊂2 for the device IND-y and a loopback part IND-y ⊂ C of the device IND-y. Due to these steps, a test signal from the tester TSTU is passed only through paths in the switching unit SW and is returned to the tester TSTU.

Under this state, steps 4-12 to 4-14 of FIG. 5 transmits a test signal through the switching unit SW to diagnose the switching unit SW. More precisely, step 4-12 instructs the tester TSTU to send, receive, and analyze a test signal. Step 4-13 instructs the tester TSTU to stop the test signal. Step 4-14 receives an analysis result from the tester TSTU and provides a determination.

Steps 4-15 to 4-16 of FIG. 5 are postprocesses. Namely, step 4-15 releases all paths, and step 4-16 releases all loopback parts to complete the test.

The prior art tests a switching unit by sending and receiving a test signal to and from each path and each loopback part. On the other hand, the present invention tests a switching unit by sending a test signal only once through a plurality of paths and collectively diagnoses the paths.

Figure 6:
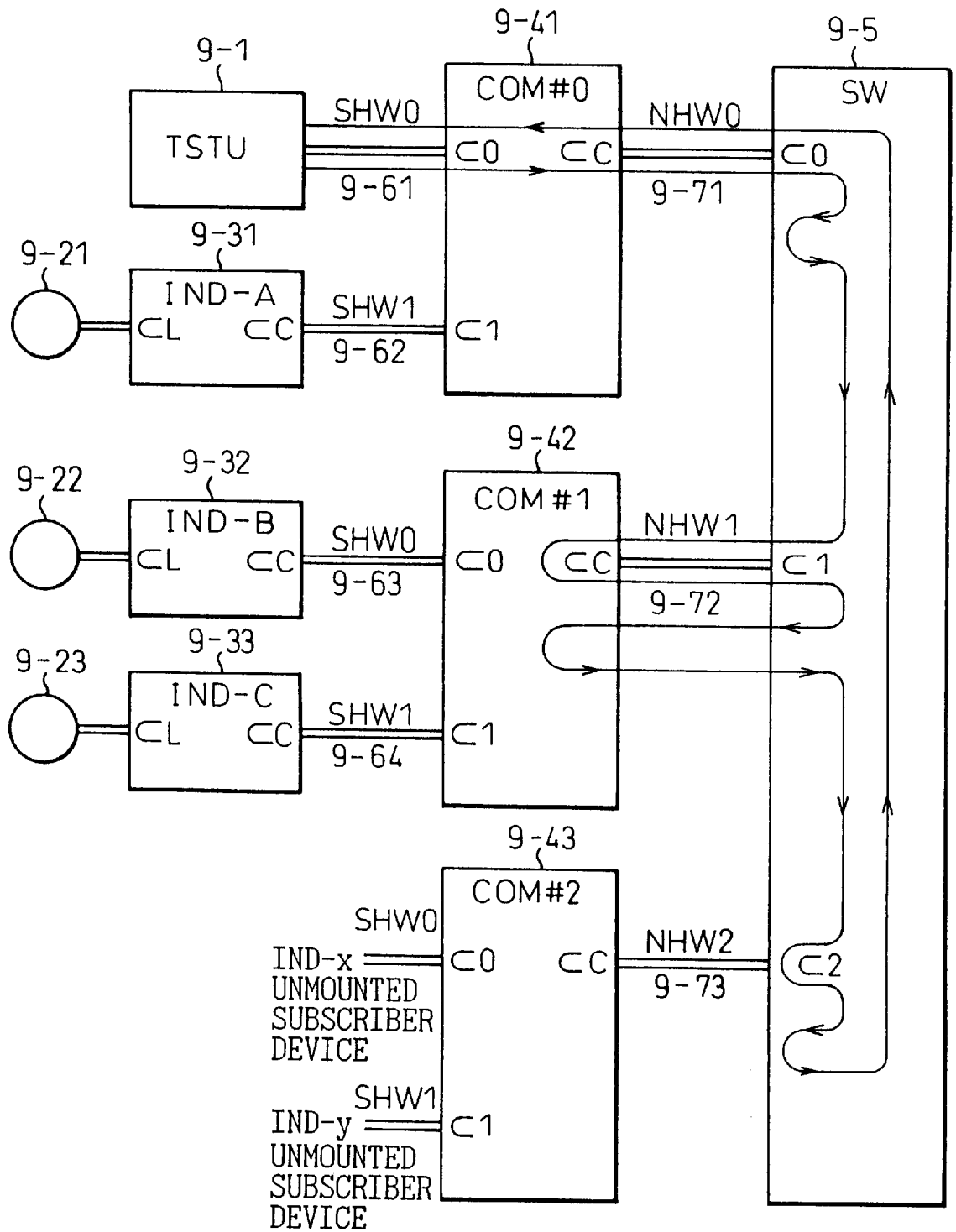
FIGS. 6 and 7 show signal routes set according to the present invention for testing common devices in the exchange of FIG. 2.
Figure 7:
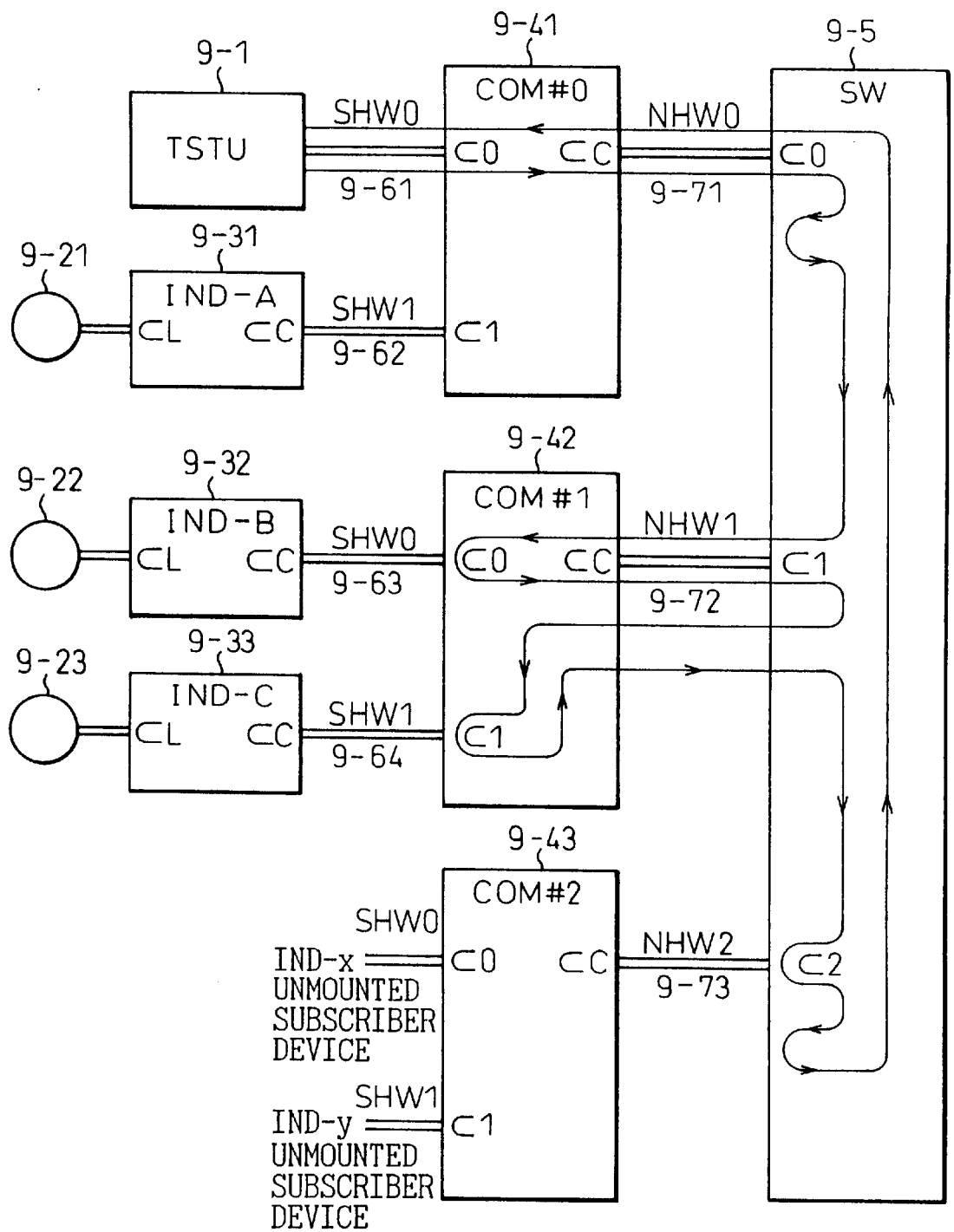
Figure 8:
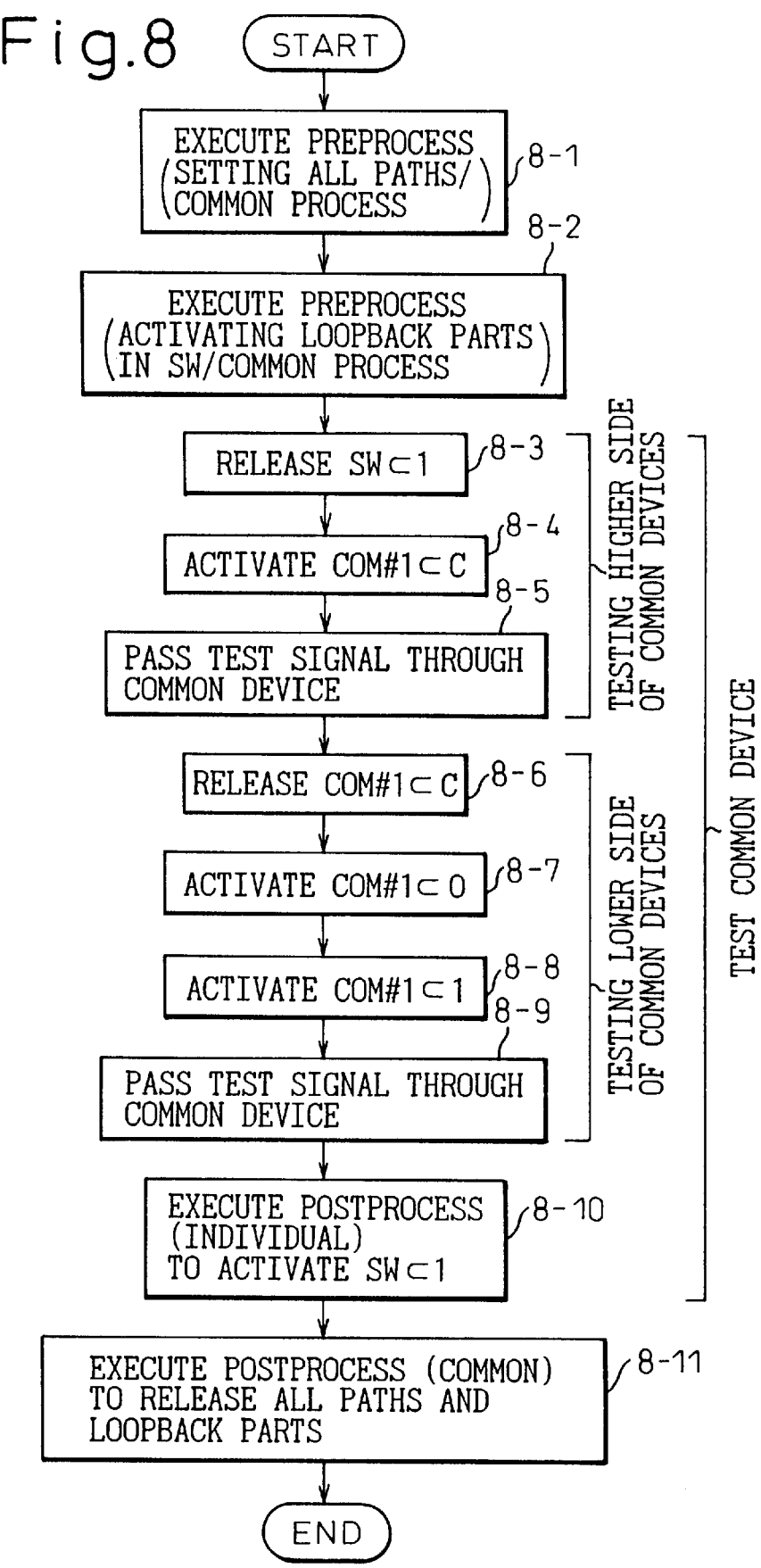
FIG. 8 is a flowchart showing the steps of testing a common device of FIG. 7.
Figure 9:
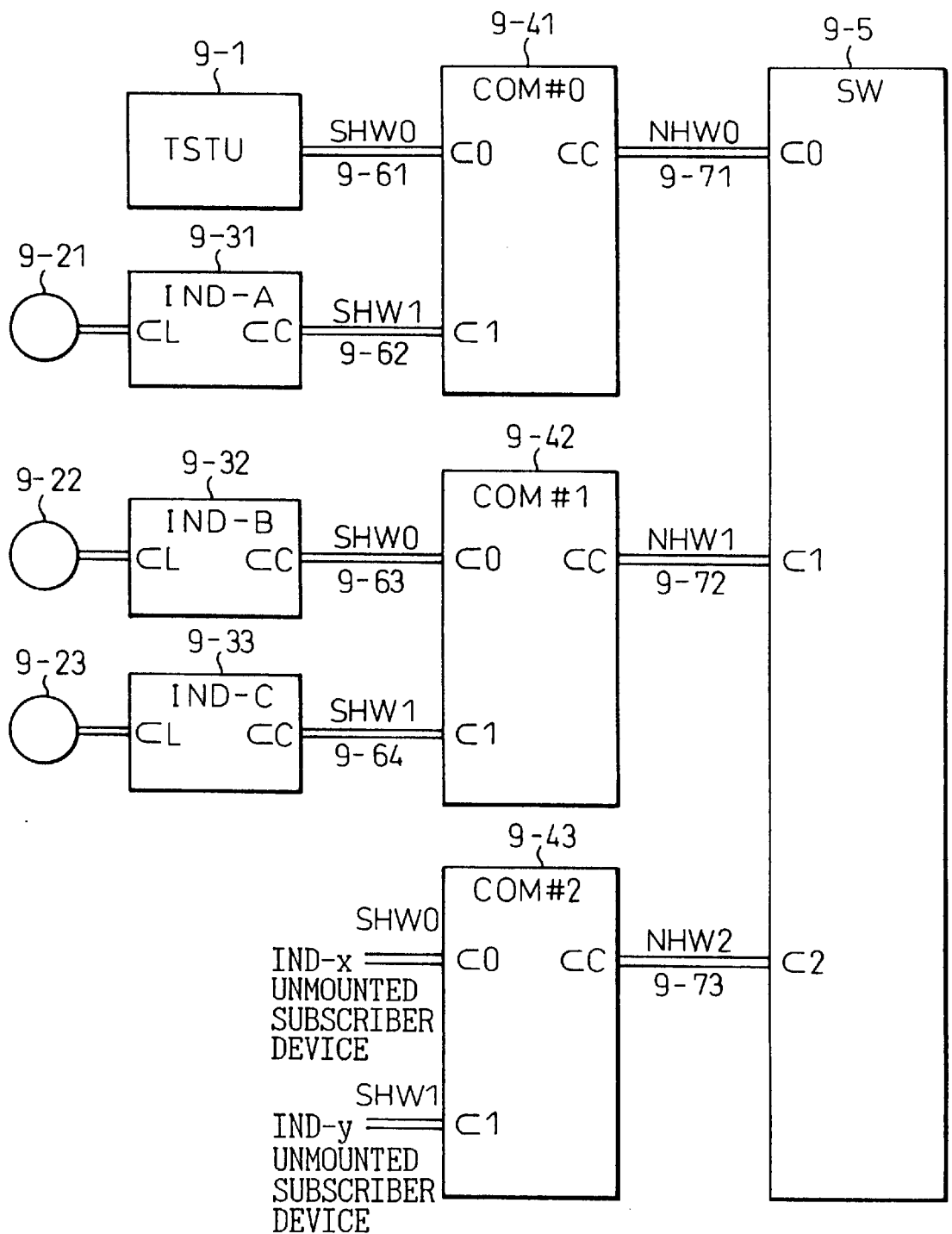
FIG. 9 shows devices that form a channel system of an exchange.
Figure 10:
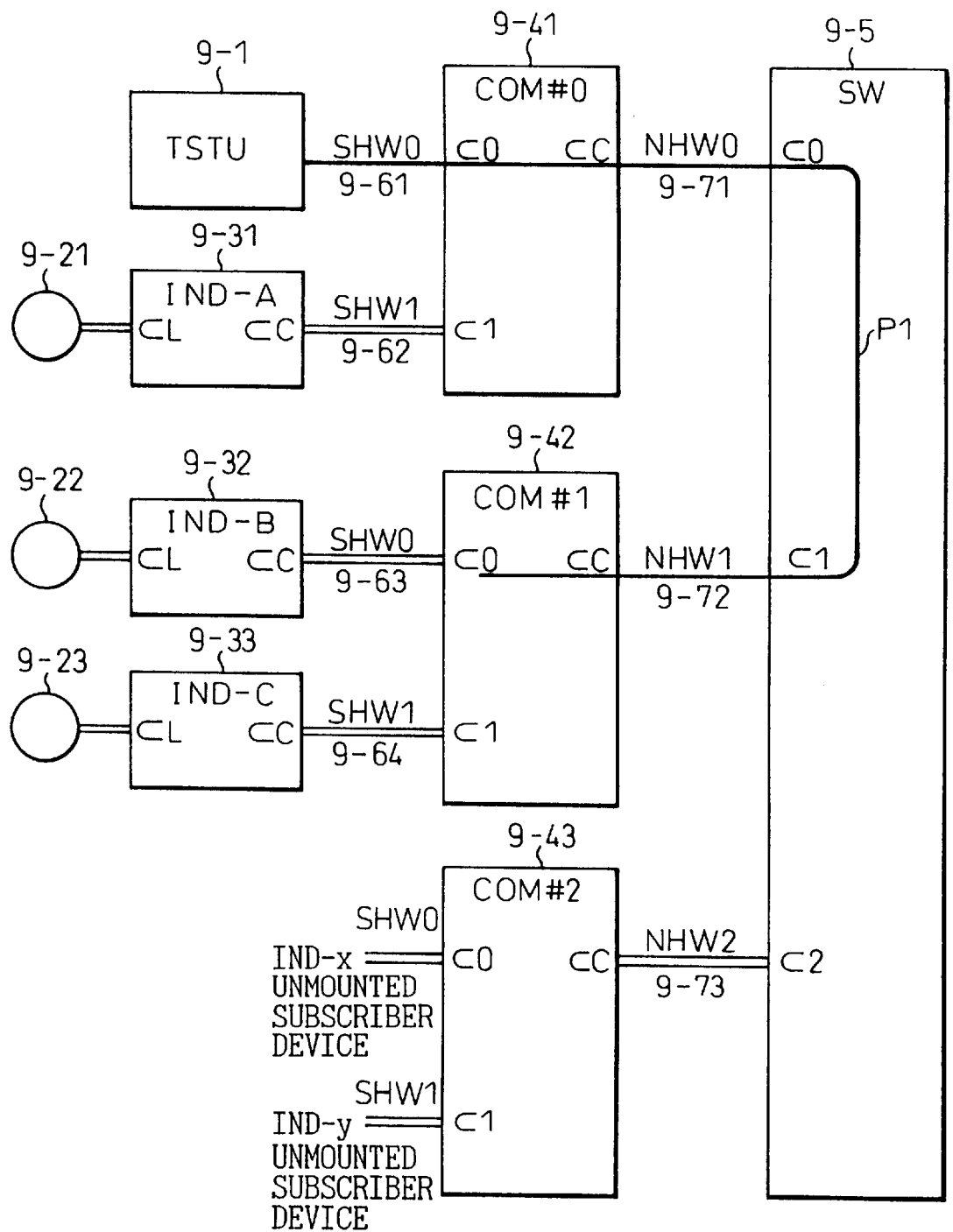
FIGS. 10 and 11 show loopback tests carried out on the devices of FIG. 9 according to a prior art.
Figure 11:
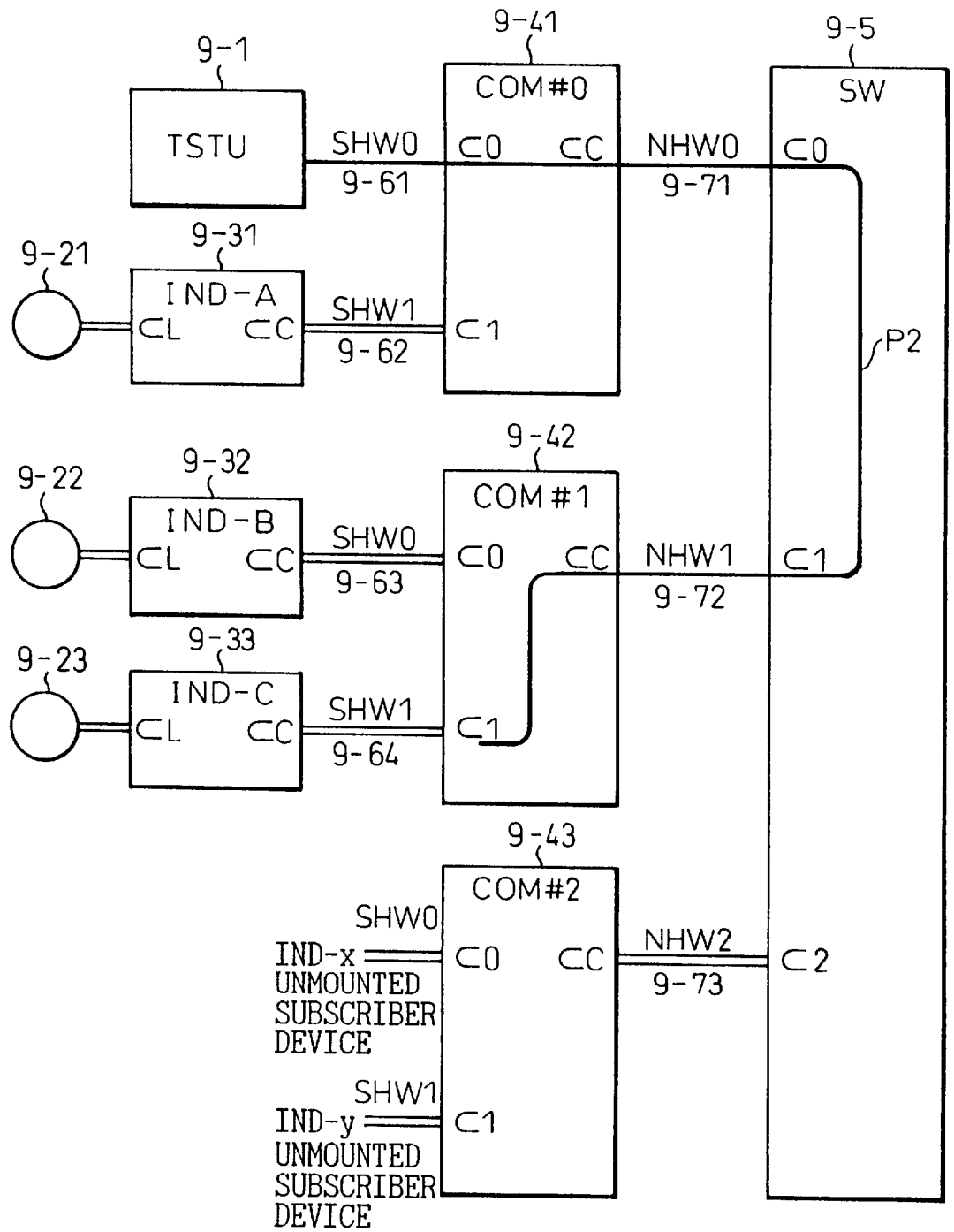
Figure 12:
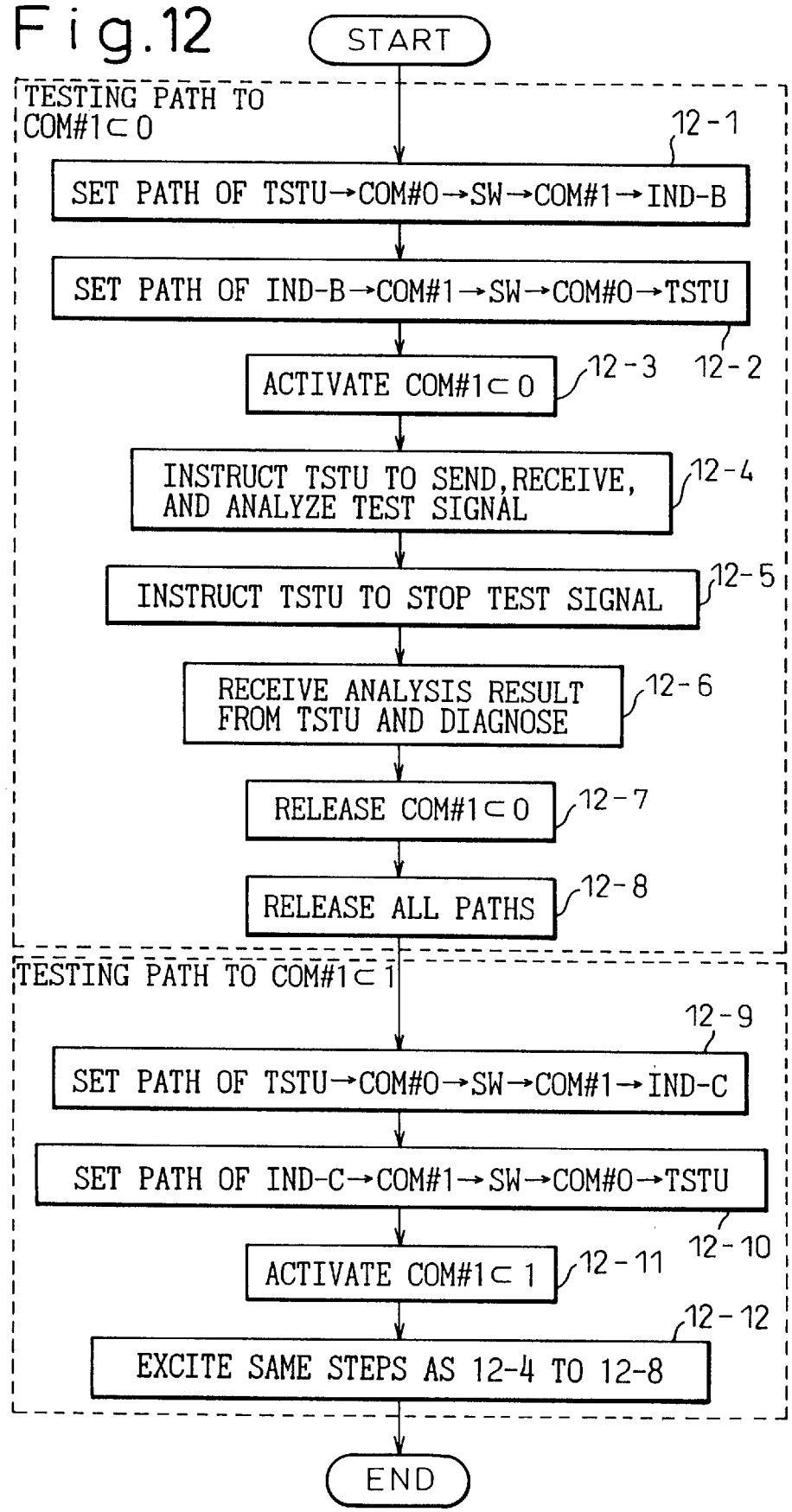
FIG. 12 is a flowchart showing the steps of carrying out loopback tests according to the prior art.
Figure 13:
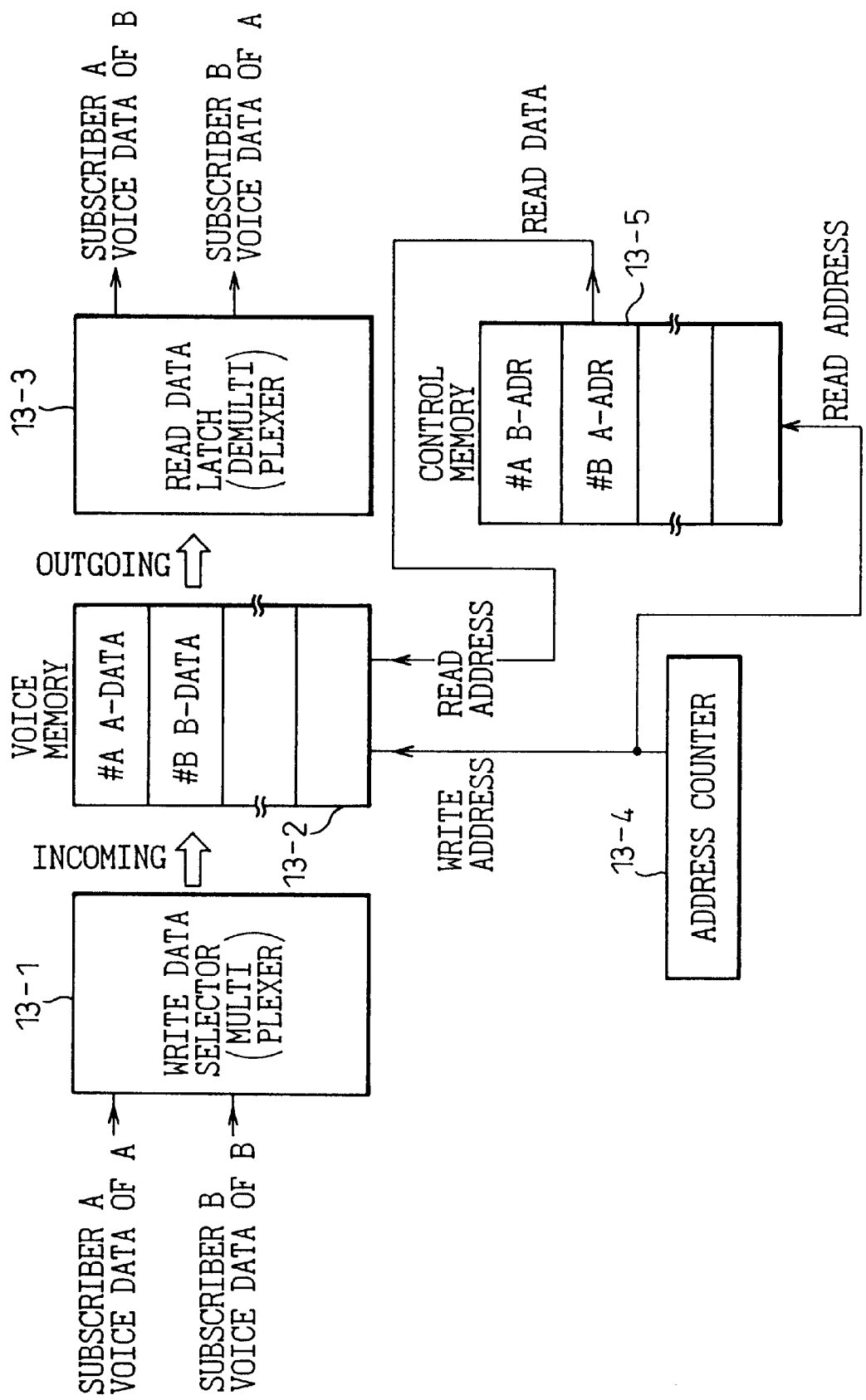
FIG. 13 shows a technique of setting paths in a switching unit with the use of a time switch.
Figure 14:
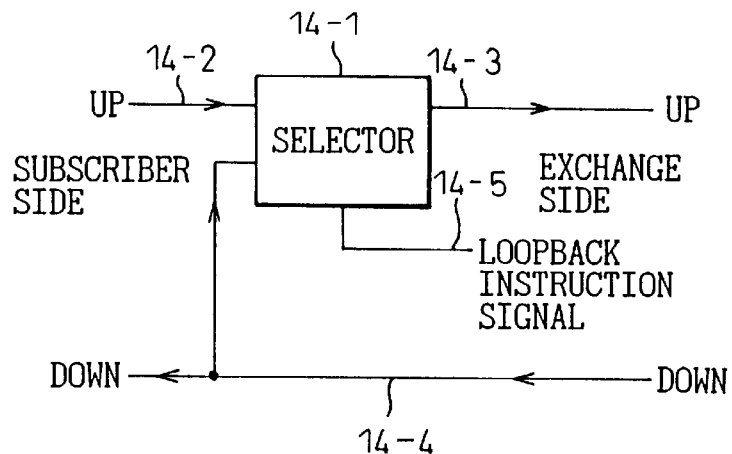
FIG. 14 shows a loopback part arranged in an exchange.
Figure 15:
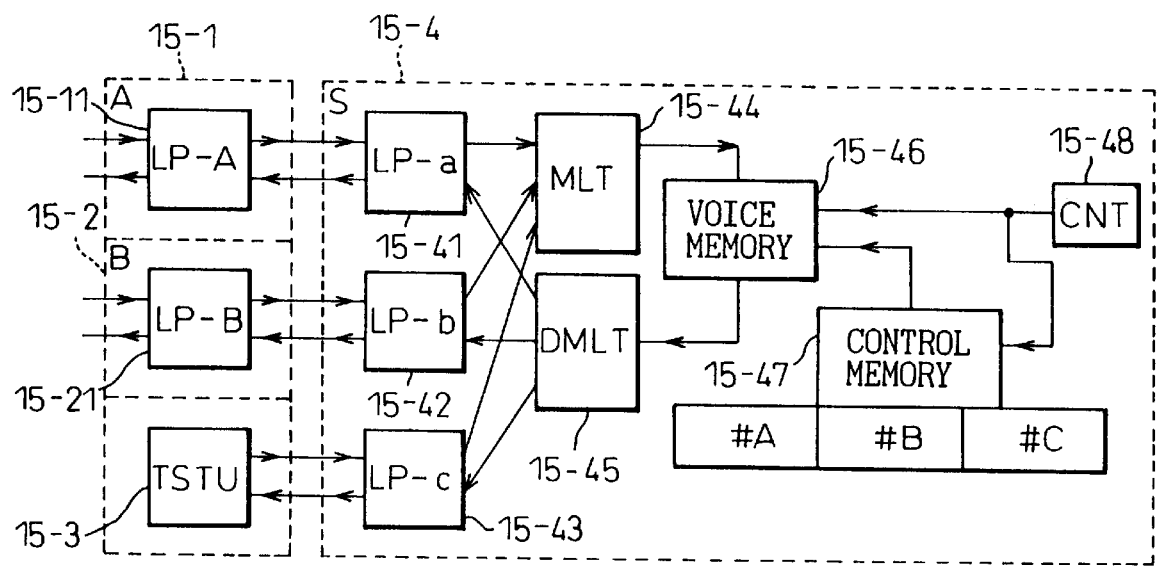
FIG. 15 shows essential devices that form a channel system of an exchange.
Figure 16:
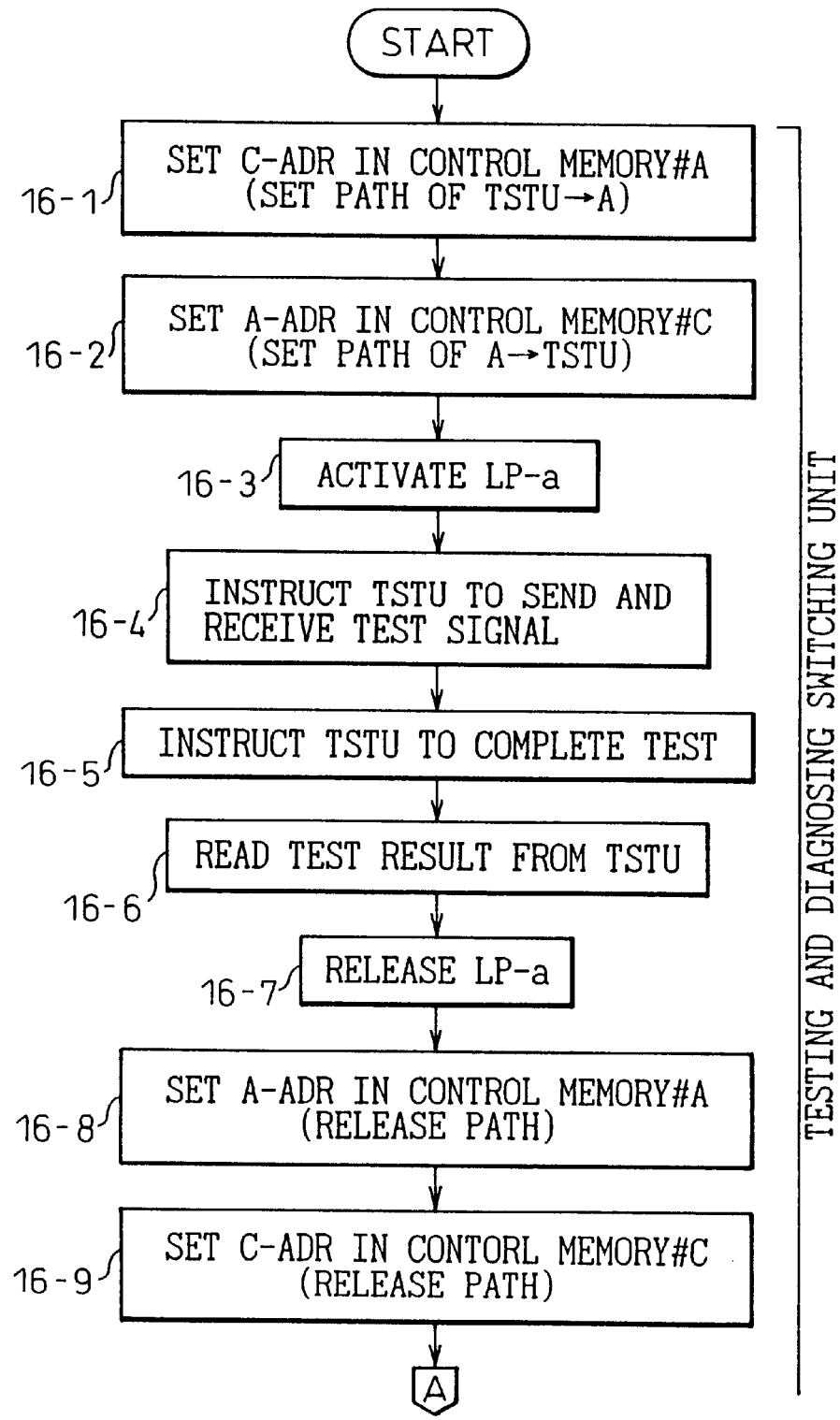
FIGS. 16 to 19 are flowcharts showing the steps of carrying out loopback tests according to the prior art.
Figure 17:
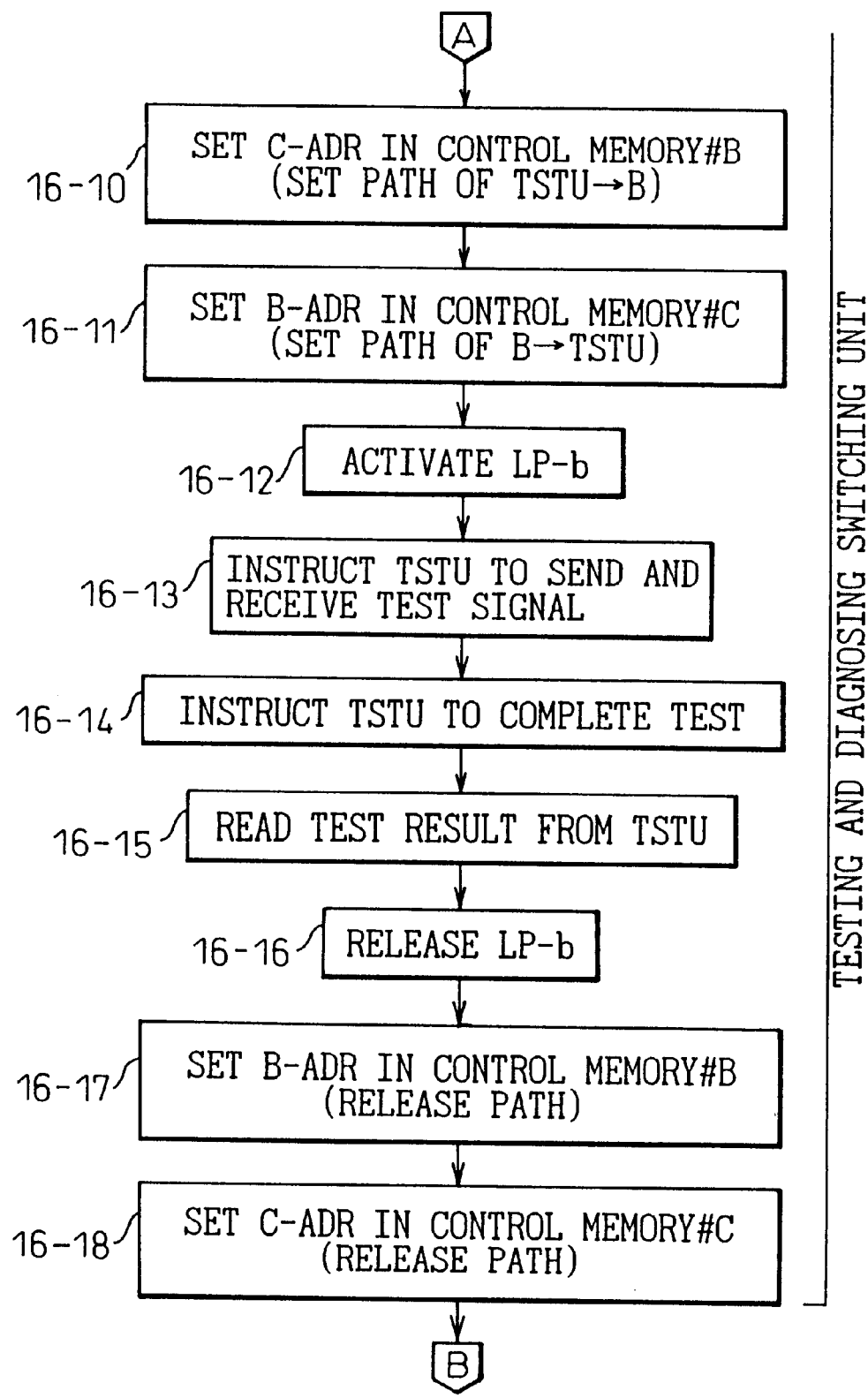
Figure 18:
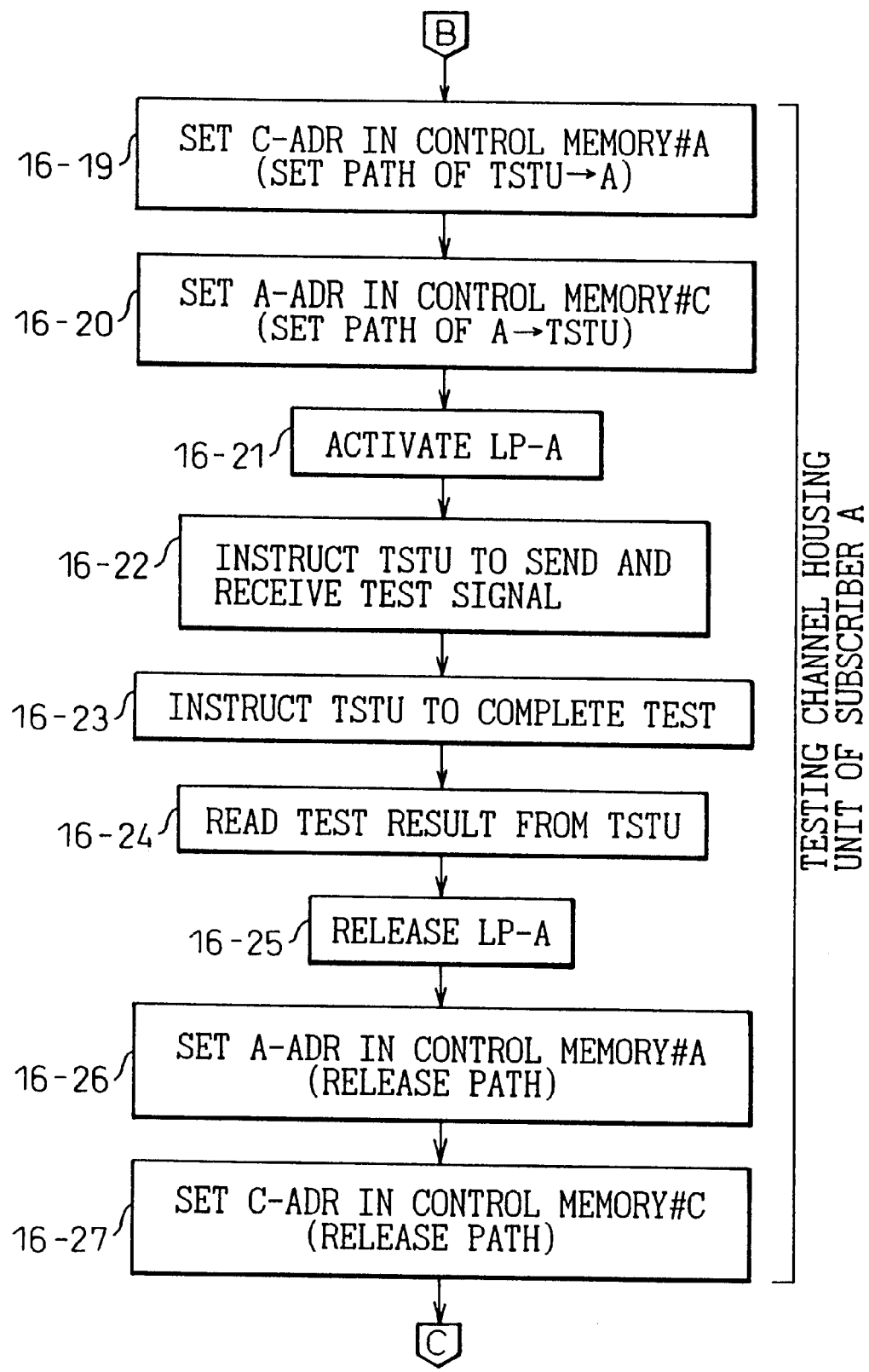
Figure 19:
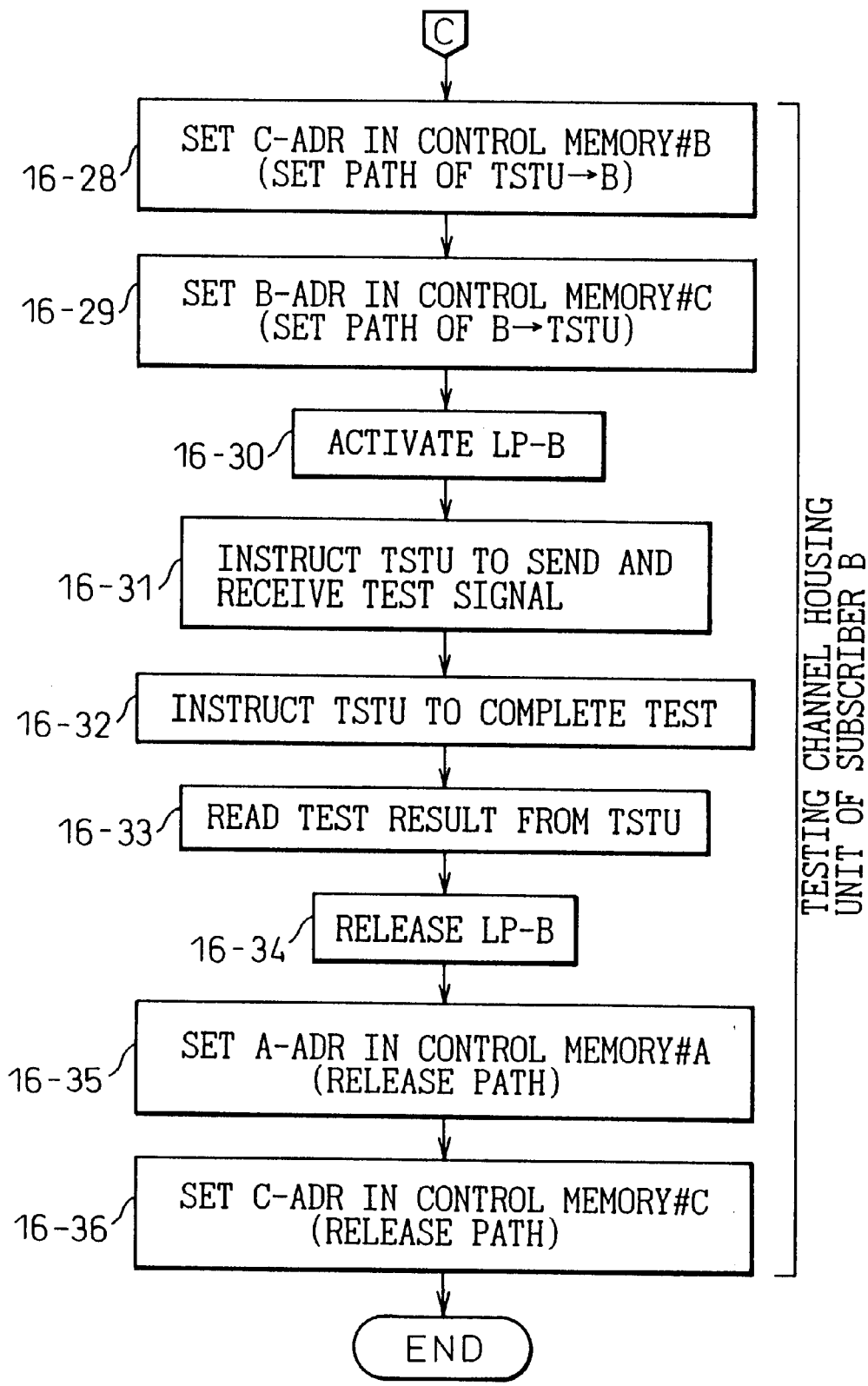

A method of testing common devices of an exchange according to the present invention will be explained with reference to FIGS. 6, 7, and 8, in which FIGS. 6 and 7 show signal routes to test common devices, and FIG. 8 is a flowchart showing the steps of testing the common devices. In FIGS. 6 and 7, the same parts as those of FIGS. 2 and 3 are represented with like reference marks and are not explained again.

Steps 8-1 and 8-2 of FIG. 8 are preprocesses. Namely, these steps set a signal route passing through all devices to be tested and activate loopback parts in a switching unit SW. These steps correspond to steps 4-1 to 4-11 of FIG. 4.

Steps 8-3 to 8-5 set a signal route of FIG. 6 and test the higher side of a common device (COM#1) 9-42.

More precisely, step 8-3 releases the loopback part SW ⊂ 1 of the switching unit SW for the common device COM#1, to extend the signal route to the common device COM#1. Step 8-4 sets a loopback part COM#1 ⊂ C of the common device COM#1.

Step 8-5 sends a test signal from the tester TSTU to the higher side of the common device COM#1 through the switching unit SW. This step corresponds to steps 4-12 to 4-14 of FIG. 5 to test the switching unit SW.

Steps 8-6 to 8-9 set a signal route of FIG. 7 to test a route up to a loopback part on the lower side of the common device COM#1. More precisely, step 8-6 releases the loopback part COM#1 ⊂ C to extend the signal route to the lower side of the common device COM#1. Step 8-7 activates a loopback part COM#1 ⊂ 0 of the common device COM#1 for an individual device (IND-B) 9-32. Step 8-8 activates a loopback part COM#1 ⊂ 1 for an individual device (IND-C) 9-33.

Step 8-9 sends a test signal from the tester TSTU to the lower side of the common device COM#1. This step corresponds to step 8-5 mentioned above.

Step 8-10 is a postprocess for the testing of the common device COM#1 and activates the loopback part SW ⊂ 1 of the switching unit SW for the common device COM#1. This is to minimize a route passing through a common device to be tested next and protect a test signal from attenuation, delay, and noise.

Step 8-11 releases all paths and all loopback parts, to complete the test. This step corresponds to steps 4-15 and 4-16 of FIG. 5.

In this way, the present invention tests common devices with a plurality of paths and loopback parts, to shorten a test time less than that of the prior art. The steps of testing common devices include steps that are common to those of testing the switching unit SW. These sharable steps simplify the method of the present invention.

When testing the common devices just after testing the switching unit SW, paths set for testing the switching unit SW may be kept as they are, and only by activating and releasing loopback parts, a testing range of common devices is defined. This simplifies the loopback-testing of common devices.

A testing range of individual devices is also defined only by activating and releasing loopback parts with respect to paths on the higher side of the individual devices.

Table (A) shows an example of determination of a fault range of devices. This table shows, as examples, a test result of the switching unit SW, a test result of a route up to the loopback part COM#1 ⊂ C of the common device COM#1, and a test result of a route up to the loopback parts COM#1 ⊂ 0 and COM#1 ⊂ 1 of the common device COM#1.

TABLE A

Determination of fault range based on test results of present invention

| SW ⊂ 1 | COM#1 ⊂ C | COM#1 ⊂ 0/⊂ 1 | Fault range |
|---|---|---|---|
| (1) Fault | — | — | SW |
| (2) Good | Fault | — | SW out or COM#1 in |
| (3) Good | Good | Fault | COM#1 inside |
| (4) Good | Good | Good | No fault |

TABLE B

Determination of fault range based on test results of prior art

| SW ⊂ 1 | COM#1 ⊂ C | COM#1 ⊂ 0 | COM#1 ⊂ 1 | Fault range |
|---|---|---|---|---|
| (1) Fault | — | — | — | SW |
| (2) Good | Fault | — | — | SW out or COM#1 in |
| (3) Good | Good | Fault | — | COM#1 inside |
| (3)' Good | Good | — | Good | No fault |
| (4) Good | Good | Good | Good | No fault |

In (1) of Table (A), the switching unit SW is determined to be fault. In (2) of Table (A), the route to the loopback part COM#1 ⊂ C of the common device COM#1 is determined to be fault. In this case, the outgoing side of the switching unit SW or the receiving side of the common device COM#1 is fault.

In (3) of Table (A), the route involving the loopback parts COM#1 ⊂ 0 and COM#1 ⊂ 1 of the common device COM#1 is determined to be fault. Namely, it is determined that a fault is inside the common device COM#1. One or both of the loopback parts ⊂ 0 and ⊂ 1 of the common device COM#1 are fault. If the common device COM#1 is a replaceable unit, the common device COM#1 as a whole is replaced with a new one, and therefore, it is not necessary to test which of the loopback parts ⊂ 0 and ⊂ 1 is fault.

In (4) of Table (A), the route involving the loopback parts ⊂ 0 and ⊂ 1 of the common device COM#1 is sound, and therefore, all devices tested are sound.

Table (B) shows a determination of fault range based on test results of the prior art. (1), (2), and (4) of Table (B) are the same as (1), (2), and (4) of Table (A). In (3) and (3)' of Table (B), the prior art separately sets paths and tests the loopback parts COM#1 ⊂ 0 and COM#1 ⊂ 1 of the common device COM#1. Even if (3) of Table (B) determines that the loopback part COM#1 ⊂ 0 is fault, (3)' of Table (B) must set another path to test the loopback part COM#1 ⊂ 1.

Although the test result (3)' of Table (B) tells that the loopback part COM#1 ⊂ 1 is sound, this result is useless because the common part COM#1 is a replaceable unit and because the loopback part COM#1 ⊂ 0 is fault in (3) of Table (B). Although Table (A) of the present invention and Table (B) of the prior art detect the same fault range, the prior art must carry out the useless test of (3)' of Table (B).

The present invention pays attention to each replaceable unit and collectively tests all functional devices included in each replaceable unit. Namely, the present invention determines a test range to obtain a minimum result sufficient for maintenance work, and according to a test result in the test range, speedily locates a fault.

As explained above, the present invention sets paths and loopback parts in a channel system of an exchange and collectively tests devices that form the channel system. The present invention employs simple test procedures to quickly carry out a loopback test on each replaceable unit that is formed with some of the devices of the channel system. The present invention optionally defines a testing range of devices only by activating and releasing loopback parts arranged in the channel system, to speedily locate a fault in the exchange and correctly maintain the exchange.

What is claimed is:

1. A method of carrying out a loopback test on devices that form a channel system of an exchange, by setting paths to connect the devices to one another, activating loopback parts arranged in the devices, sending a test signal from a tester to the devices through the paths, receiving the test signal looped back by the loopback parts, analyzing the received signal, and diagnosing the devices according to the analysis, the method comprising the steps of:

forming a signal route by activating some of the paths and loopback parts, to serially connect ones of the devices that are going to be tested and that form at least one unit as an exchange element; and sending a test signal from the tester to the signal route, receiving the test signal looped back by the activated loopback parts, and analyzing the received signal.

2. The method of claim 1, wherein the signal route forming step includes the steps of:

setting paths for connecting all devices to be tested to one another in advance; and activating and releasing the loopback parts on each loopback test, to form a signal route for the loopback test and define a testing range for the loopback test.

3. The method of claim 2, wherein:

the exchange has a switching unit, common devices shared by channels, and individual devices provided for the channels, respectively, the switching unit serving as a higher device and the common and individual devices serving as lower devices, the higher and lower devices being sequentially connected to one another; and a signal route used to carry out a loopback test on the lower devices is formed by releasing loopback parts of the higher device related to the lower devices without setting new paths.

4. The method of claim 3, comprising the step of:

activating the loopback parts of the higher device related to the lower devices upon completion of the loopback test on the lower devices.

5. An apparatus for carrying out a loopback test on devices that form a channel system of an exchange, comprising:

path setting means for simultaneously setting paths to serially connect some of the devices that are going to be tested and that form at least one unit as an exchange element;

loopback control means for simultaneously activating and releasing loopback parts arranged in the devices along the paths; and test means for sending a test signal to the devices through the paths, receiving the test signal looped back by the loopback parts, analyzing the received signal, and determining whether or not the devices are sound.

6. The apparatus of claim 5, wherein:

the path setting means sets paths for all devices to be tested in advance;

the loopback control means activates and releases the loopback parts on each loopback test, to define a testing range for the loopback test.

7. The apparatus of claim 6, wherein:

the exchange has a switching unit, common devices shared by channels, and individual devices provided for the channels, respectively, the switching unit serving as a higher device and the common and individual devices serving as lower devices, the higher and lower devices being sequentially connected to one another; and a signal route to carry out a loopback test on the lower devices is formed by releasing loopback parts of the higher device related to the lower devices without setting new paths.

8. The apparatus of claim 7, wherein the loopback control means activates the loopback parts of the higher device related to the lower devices upon completion of the loopback test on the lower devices.

* * * * *